United States Patent
Jones

(12) 
(10) Patent No.: US 9,569,949 B1
(45) Date of Patent: Feb. 14, 2017

(54) SMARTPHONE CHARGING ALARM FEEDBACK DEVICE

(71) Applicant: Daniel Jonathan Jones, Maryville, TN (US)

(72) Inventor: Daniel Jonathan Jones, Maryville, TN (US)

(73) Assignee: Daniel Jonathan Jones, Maryville, TN (US)

( * ) Notice: Subject to any disclaimer, the term of this patent is extended or adjusted under 35 U.S.C. 154(b) by 0 days.

(21) Appl. No.: 14/871,854

(22) Filed: Sep. 30, 2015

(51) Int. Cl.
*G08B 21/18* (2006.01)
*G08B 7/06* (2006.01)
*H02J 7/00* (2006.01)

(52) U.S. Cl.
CPC ............... *G08B 21/18* (2013.01); *G08B 7/06* (2013.01); *H02J 7/0044* (2013.01)

(58) Field of Classification Search
CPC .......... G08B 21/18; G08B 7/06; H02J 7/0044; H02J 2007/0049; H02J 2007/0047; H02J 2007/005
USPC ...................................................... 340/636.1
See application file for complete search history.

(56) References Cited

U.S. PATENT DOCUMENTS

| | | | |
|---|---|---|---|
| 2013/0285600 A1* | 10/2013 | Ishikawa | H01M 10/443 320/107 |
| 2016/0072323 A1* | 3/2016 | Miller | H02J 7/0031 320/105 |
| 2016/0111914 A1* | 4/2016 | Willard | H02J 9/061 307/66 |

* cited by examiner

*Primary Examiner* — Joseph Feild
*Assistant Examiner* — Omar Casillashernandez
(74) *Attorney, Agent, or Firm* — Daniel Jonathan Jones

(57) ABSTRACT

An alarm feedback circuit for alerting Smartphone users when the Smartphone internal battery is fully charged is provided. The alarm feedback circuit includes necessary circuitry sufficient to monitor the current draw of the Smartphone internal battery and provide a visual and audible alarm once the Smartphone battery is fully charged. The alarm feedback circuit is configured to be used with Smartphone chargers of the type considered to be compatible with the European Union specification for a common External Power Supply (EPS) which are used for Smartphones and adopted by the majority of the world's largest Smartphone manufacturers.

15 Claims, 5 Drawing Sheets

SMARTPHONE CHARGING ALARM FEEDBACK DEVICE

CROSS-REFERENCE TO RELATED APPLICATIONS

The present application claims benefit and priority of U.S. Provisional Application No. 62/069,237, Filed Oct. 27, 2014 Titled, Smartphone Charging Alarm Feedback Device, of which the entire disclosure of is incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present disclosure relates to a Smartphone charging alarm feedback device comprising of an alarm feedback circuit in which an alarm is activated when a Smartphone is fully charged.

BACKGROUND OF THE INVENTION

The statements in this section merely provide background information related to the present disclosure and may not constitute prior art.

There are many known Smartphone charging devices. Most Smartphone charging devices are comprised of a small electrical outlet plug containing the Smartphone alternating current (AC) to direct current (DC) charging circuit which is connected to the Smartphone by a standard Universal Serial Bus (USB) type cable. The USB type cable can be disconnected from the AC to DC charging unit for other purposes such as using the USB type cable to connect the Smartphone to a personal computer. A good example of said charging device is the type of charger compatible with the European Union specification for a common External Power Supply (EPS) used for Smartphones. The EPS specification Smartphone charger has been adopted by the majority of the world's largest Smartphone manufacturers which are sold in countries all over the world. The Smartphone charging devices meeting this specification are configured to connect to Smartphones using a USB type cable. Said Smartphone charging devices convert AC voltage to DC voltage and provide 5 volts DC for charging the Smartphone device.

In recent years said Smartphone charging devices utilizing a USB type cable have become a standard for most Smartphone manufacturers. As such, Smartphone manufacturers have designed their Smartphones to utilize batteries conducive to charging with said industry standard charging devices. The USB type interface to the charging unit allows for connection to personal computers for the purpose of data transfer as well as charging the Smartphone devices while connected to the personal computer's USB port.

Said Smartphone charging devices utilizing a USB type cable are designed specifically for Smartphone charging without any type of Smartphone battery charge status alert to the user. Typically, when a Smartphone user charges a Smartphone the Smartphone is left unattended even after the Smartphone battery reaches a full charge due to the user not having a good indicator that the Smartphone battery is fully charged. It should be noted that most Smartphones do have a Light Emitting Diode (LED) flashing indicator built into the Smartphone itself to indicate when the battery is fully charged. However, in most cases, the user may not see this LED indicator without physically touching or activating the Smartphone and/or unless the user is in close proximity of the Smartphone. It should also be noted that said LED indicator built into the Smartphone may also be used to indicate when a Smartphone has received an email or text message in which it may be difficult for the user to discern if the phone battery is fully charged or if an email/text message has been received.

A need, therefore, exists for a charge status indicator in which the Smartphone user is alerted once the Smartphone battery is fully charged. More specifically, a need exists for an alarm to alert the Smartphone user once the Smartphone battery is fully charged that may be noticeable by the user from a distance and/or without having to physically touch or activate the Smartphone.

SUMMARY OF THE INVENTION

The present teaching seeks to provide an alarm feedback circuit compatible with said USB type Smartphone charging devices to alert the user when the Smartphone is fully charged. The present teaching comprises of a voltage monitoring circuit coupled with an alarm feedback circuit compatible with USB type Smartphone charging devices. Power to the circuitry of the present teaching is provided by the Smartphone charging device. The present teaching is configured to connect between the Smartphone charging unit and the Smartphone device using USB type connections.

The present teaching includes an audible alarm as well as a visual LED alarm used to alert the Smartphone user when the Smartphone device battery is fully charged. The audible alarm may be configured to emit a beeping sound when the Smartphone is fully charged. Similarly, the visual LED alarm may be configured to flash when the Smartphone battery is fully charged. Both the audible and visual alarms may be preset to emit their respective audible or visual alert simultaneously at an interval defined by the inventor. Both the audible and visual alarms may be configured such that the Smartphone user may be able to observe the alarms from a distance and/or without having to physically touch or activate the Smartphone.

The present teaching includes a user control feature such that the user may switch between audible and visual alarm or visual alarm only. This feature may be used in settings where an audible alarm may not be convenient such as at night time when the user is sleeping or when the user is in a public setting. Said user control feature may be accessible from the exterior of the invention's enclosure which houses the alarm feedback circuitry.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
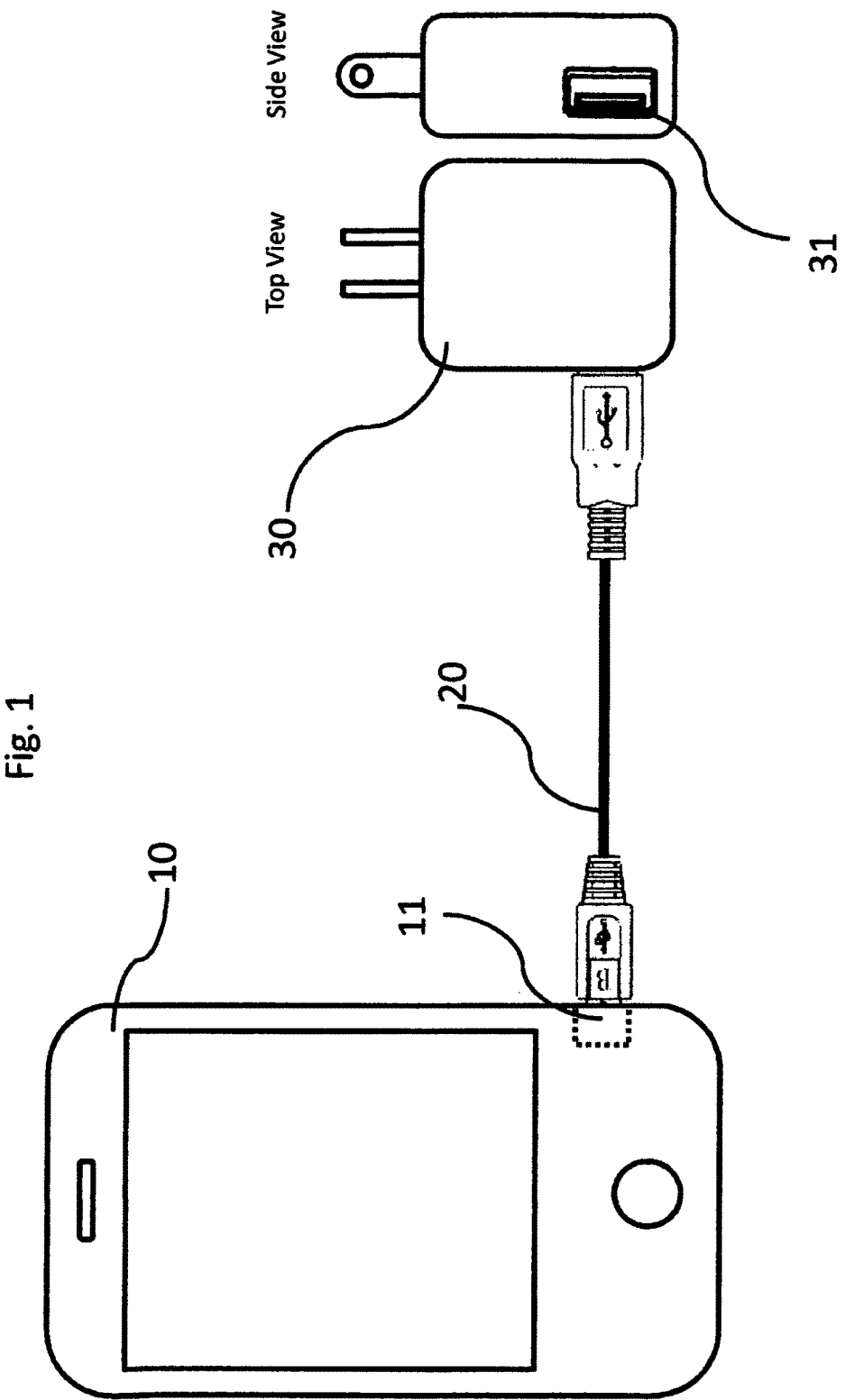
FIG. 1 is a perspective view, showing a Smartphone charging device utilizing a USB type connection to a Smartphone.

With initial reference to FIG. 1, a Smartphone 10 is connected to a Smartphone charging device 30 using a standard USB Type A Male to USB Type B Male cable 20 as illustrated. The Smartphone charging device 30 may have a USB Type A Female Port 31 on the side of the Smartphone charging device 30 as illustrated. Alternately, the Smartphone charging device 30 may have a USB Type A Female Port 31 on any other surface of the device but is not illustrated. The Smartphone 10 may have a USB Type B Female Port 11 on the side of the Smartphone 10 as illustrated. Alternately, the Smartphone 10 may have a USB Type B Female Port 11 on any other surface of the Smartphone 10 but is not illustrated.

Figure 2:
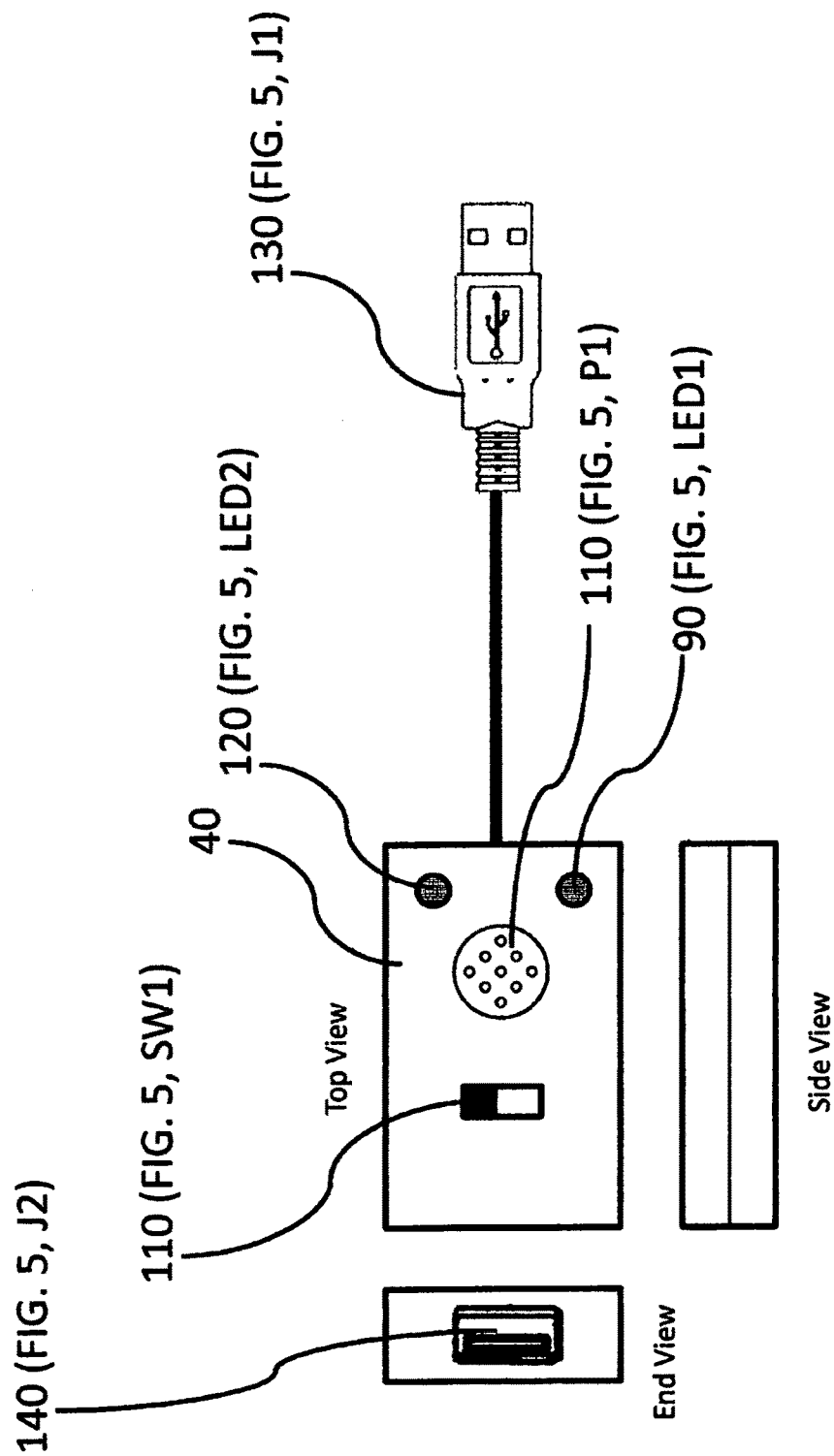
FIG. 2 is a perspective view, showing the present invention.

With reference to FIG. 2, the Smartphone Charging Alarm Feedback Device 40 is depicted with an attached USB Type A Male 130 cable. The USB Type A Male 130 cable may be used to connect the Smartphone Charging Alarm Feedback Device 40 to a Smartphone charging device 30 as shown in FIG. 3.

Figure 3:
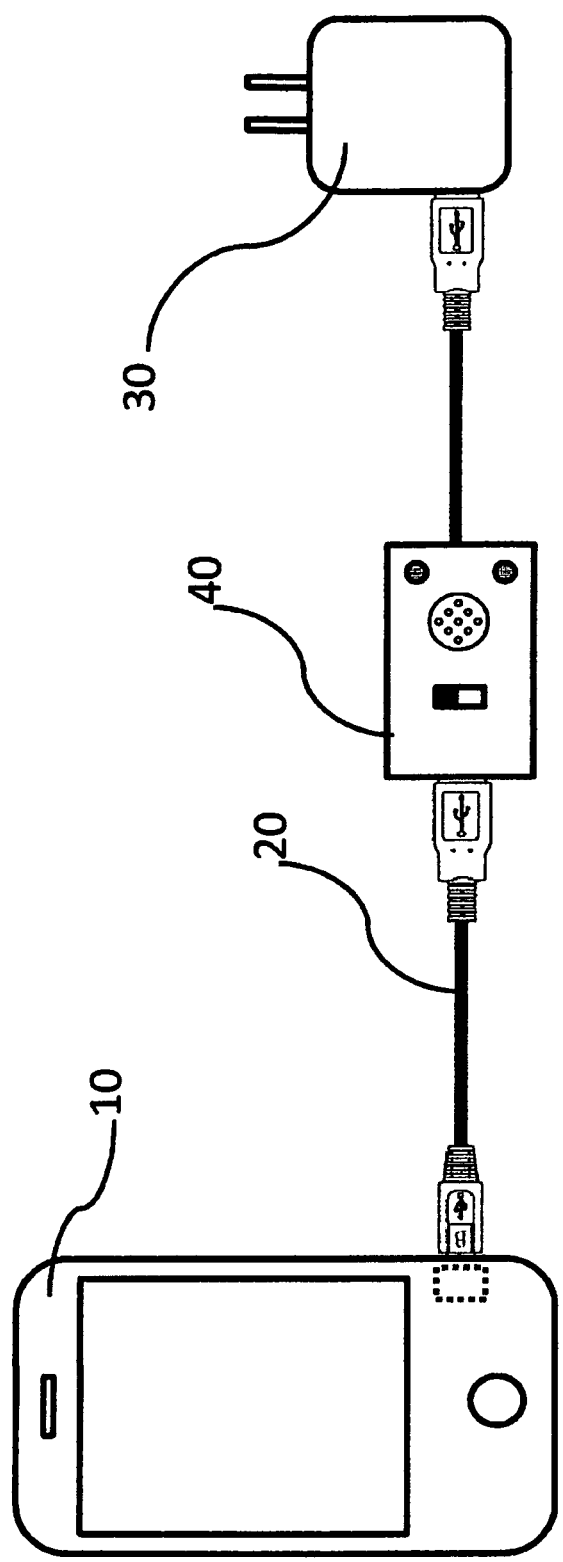
FIG. 3 is a perspective view, showing the present invention attached to a Smartphone charging device utilizing a USB type connection to a Smartphone.

With reference to FIG. 3, a Smartphone 10 is depicted as being attached to the Smartphone Charging Alarm Feedback Device 40. Referring back to FIG. 2, the Smartphone Charging Alarm Feedback Device 40 may include a USB Type A Female 140 connector port to connect the standard USB Type A Male to USB Type B Male cable 20. The ideal method of attaching a Smartphone 10 to the Smartphone Charging Alarm Feedback Device 40 may be achieved using a standard USB Type A Male to USB Type B Male cable 20 whereas the USB Type A end of said cable may be connected to the USB Type A Female 140 connector port of the Smartphone Charging Alarm Feedback Device 40 and the USB Type B cable end of said cable may be connected to the USB Type B Female Port 11 of the Smartphone 10. Referring to FIG. 3, the Smartphone Charging Alarm Feedback Device 40 with attached USB Type A Male 130 cable is depicted as being attached to a Smartphone charging device 30 using a USB Type A Female Port 31 as depicted in FIG. 1.

PREFERRED EMBODIMENT OF THE INVENTION

In a preferred embodiment of the invention, the Smartphone Charging Alarm Feedback Device 40 may be attached between the Smartphone 10 and the Smartphone charging device 30 as illustrated in FIG. 3 and previously described. The Smartphone 10 may be connected to the Smartphone Charging Alarm Feedback Device 40 using a standard USB Type A Male to USB Type B Male cable 20. The Smartphone Charging Alarm Feedback Device 40 may be connected to a Smartphone charging device 30 using a USB Type A Male 130 cable which may be attached internally and electrically to the Smartphone Charging Alarm Feedback Device 40.

Figure 4:
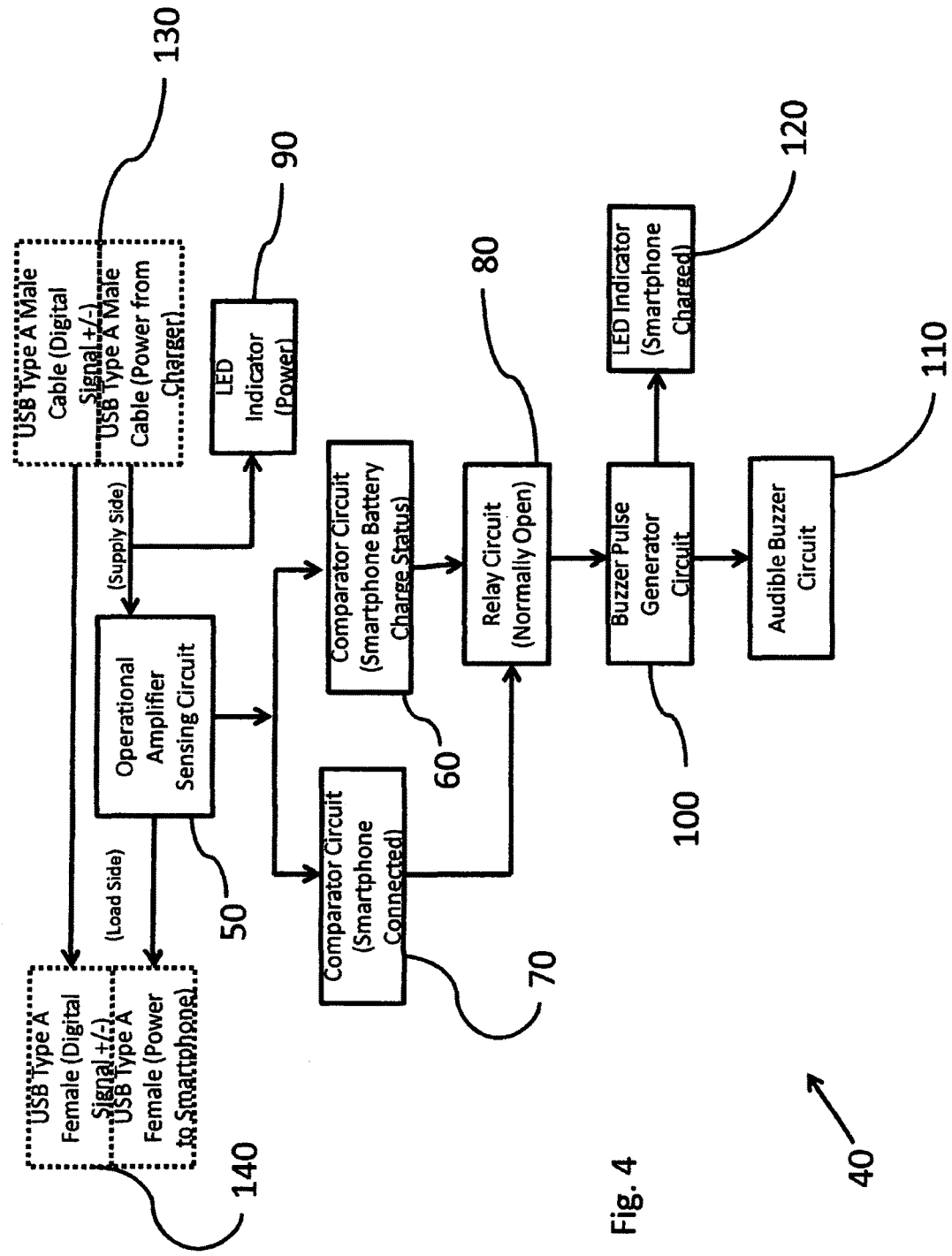
FIG. 4 is a block diagram of the present invention.
Figure 5:
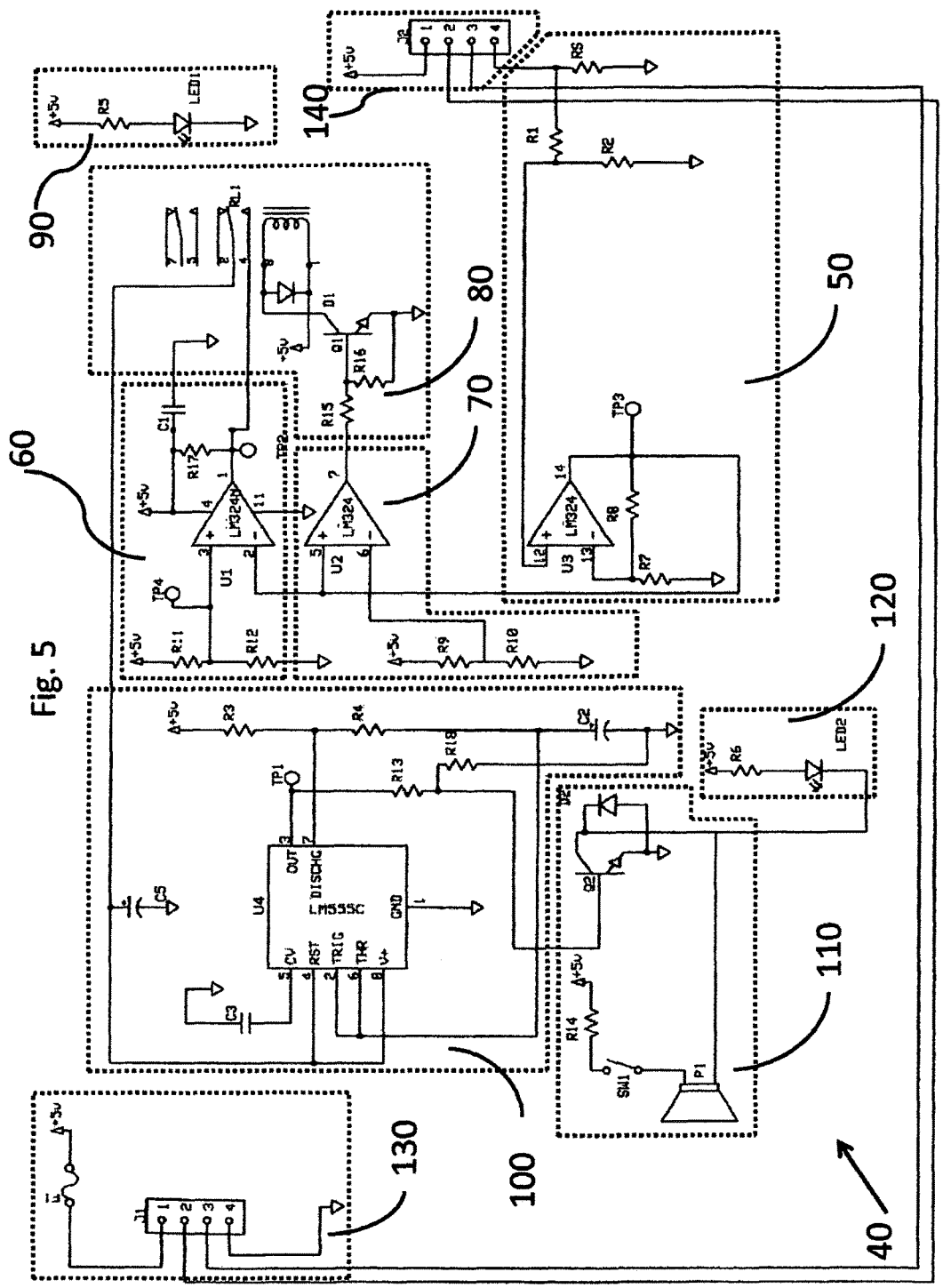
FIG. 5 is a schematic view, showing the components of the present invention with hashed lines corresponding to the block diagram.

Referring now to FIGS. 4 and 5, the Smartphone Charging Alarm Feedback Device 40 may contain internal circuitry configured such that a Smartphone 10 may be monitored to detect when the Smartphone 10 internal battery may be fully charged. Further, the Smartphone Charging Alarm Feedback Device 40 may contain internal circuitry configured to alert the Smartphone 10 user when the battery may be fully charged. To achieve said functions, further detail will be explained in the proceeding descriptions.

Once the Smartphone Charging Alarm Feedback Device 40 is connected to a Smartphone 10 and Smartphone charging device 30 as shown in FIG. 3, a series of circuitry internal to the Smartphone Charging Alarm Feedback Device 40 may be used to detect and alert when a Smartphone 10 internal battery may be fully charged.

FIGS. 4 and 5 depict an Operational Amplifier Sensing Circuit 50 in series with the USB Type A Male 130 cable (supply side) and the USB Type A Female 140 connector (load side). Ohm's Law teaches us that by placing a low resistance value resistor in series with a current path produces a small voltage drop across said resistor proportional to current draw across said resistor which can serve as a measurable signal. Resistor RS in the Operational Amplifier Circuit 50 is of a low resistance value and may be used to demonstrate current draw and proportional voltage drop across resistor RS as the Smartphone 10 internal battery is charged. It should be noted that by using a resistor with a low resistance value for resistor RS may not affect the load device significantly or noticeably by the user.

With reference to FIGS. 4 and 5, demonstrating the current draw and proportional voltage drop across resistor RS may be achieved by connecting resistor RS in series with the negative voltage from the Smartphone charging device 30 going to the Smartphone 10. The negative voltage may be passed from the Smartphone charging device 30 through the Smartphone Charging Alarm Feedback Device 40 using the USB Type A Male 130 cable on the supply side and the USB Type A Female 140 connector on the load side. To monitor the current draw and proportional voltage drop across resistor RS one may connect the load side of RS to the (+) input of operational amplifier U3 through resistor R1. Similarly, the supply side of resistor RS to the Smartphone 10 may be connected to the (−) input of operational amplifier U3 through resistor R7. Effectively, the supply side of resistor RS may become the ground path for the Smartphone Charging Alarm Feedback Device 40 internal circuitry and may also serve as the negative voltage source for the Smartphone 10 which may be connected to the Smartphone Charging Alarm Feedback Device 40 as previously described in FIG. 3. In this configuration, the output of operational amplifier U3 may provide an output voltage equal to the voltage drop across resistor RS. By measuring the voltage drop across resistor RS, one may demonstrate that as the Smartphone 10 internal battery reaches a fully charged state, the voltage drop proportional to current draw of the Smartphone 10 internal battery across resistor RS may drop to a lower level. The voltage drop measured across resistor RS may be a small voltage measured in milli-volts. For example, when the Smartphone 10 internal battery is at a 0% charge state, the voltage drop across resistor RS may be 0.038 volts. Resistors R1, R2, R7 and R8 values of the Operational Amplifier Sensing Circuit 50 may be used to amplify the output of operational amplifier U3. The values of resistors R1, R2, R7 and R8 are selected such that the output of operational amplifier U3 may be amplified by 100 times thus producing a voltage signal that may be more easily monitored to determine the point at which the Smartphone 10 internal battery may be fully charged. By measuring the output of operational amplifier U3 configured with R1, R2, R7 and R8 signal amplification as previously described and shown in Operational Amplifier Sensing Circuit 50, one may observe that as the Smartphone 10 internal battery is charged, the output may change from a higher voltage level of 3.8 volts (Smartphone 10 internal battery 0% charge state) to a lower voltage level of 2.25 volts (Smartphone 10 internal battery 100% charge state).

FIGS. 4 and 5 depict a an additional circuit shown as a Comparator Circuit 60 where as an operational amplifier may be configured to compare two voltage signals in which the amplified output of previously described Operational Amplifier Sensing Circuit 50 is fed into the (−) input of operational amplifier U1. The (+) input of operational amplifier U1 may be configured with resistors R11 and R12. The values of R11 and R12 may be chosen such that a reference voltage of 2.25 volts is supplied to the (+) input of operational amplifier U1. In the said configuration of Comparator Circuit 60, the output of U1 remains low until the amplified signal from Operational Amplifier Sensing Circuit 50 connected to the (−) input of operational amplifier U1 drops to a level matching the reference voltage supplied to the (+) input using resistors R11 and R12. At the point which the (−) input of operational amplifier U1 drops to 2.25 volts matching the reference voltage applied to the (+) input using resistors R11 and R12, the output of Comparator Circuit 60 may change to a high state of approximately 3.5 volts indicating that the Smartphone 10 internal battery may have reached a fully charged state. The output of U1 may be configured with Resistor R17 to provide stability for the output voltage.

FIGS. 4 and 5 depict an additional circuit shown as Comparator Circuit 70 which may be configured with Relay Circuit 80 to disable Buzzer Pulse Generator Circuit 100 which may provide the driving voltage for Audible Buzzer Circuit 110. The purpose of Comparator Circuit 70 is to disable the output signal of Comparator Circuit 60 when the Smartphone 10 may be disconnected from the Smartphone Charging Alarm Feedback Device 40. Further, the purpose of said circuitry may be to mute the Audible Buzzer Circuit 110 once the Smartphone 10 has reached a fully charged state and is disconnected from the Smartphone Charging Alarm Feedback Device 40 by the user.

To achieve previously said function of disabling the output signal of Comparator Circuit 60 and effectively muting the Audible Buzzer Circuit 60 when the Smartphone 10 may be disconnected from the Smartphone Charging Alarm Feedback Device 40 by the user; refer again to FIGS. 4 and 5. The output signal of U1 in Comparator Circuit 60 may be routed through the Normally Open contacts of relay RL1 shown in the Relay Circuit 80. The Normally Open contacts of relay RL1 are commonly known to remain open until a sufficient voltage may be applied to the coil of relay RL1 causing the contacts to close and thus may be allowing a voltage signal to pass across the contacts of relay RL1. Thus creating a switching circuit in which a signal applied to the Normally Open contacts of relay RL1 may be enabled or disabled. The switching action of relay RL1 may be achieved by connecting the positive side of relay RL1 coil to the output of Comparator Circuit 70 which may remain low or zero volts until the voltage applied to the (+) input of U2 is equal to or greater than the reference voltage applied to the (−) input of U2 which may cause the output to go to a high state of approximately 3.8 volts.

Further, to achieve previously said switching of relay RL1, the (+) input of U2 is connected to the output of Operational Amplifier Sensing Circuit 50 which as previously explained produces a voltage signal relative to the charging state of the Smartphone 10 internal battery. The (−) input of U2 is connected to resistors R9 and R10. The values of resistors R9 and R10 may be selected to provide a reference voltage of 0.005 volts. In said configuration of Comparator Circuit 70, the output of U2 may remain high as long as the voltage being compared on the (+) input which is fed from Operational Amplifier Sensing Circuit 50 is greater than said reference voltage fed into the (−) input of U2 configured with resistors R9 and R10. When the output of U2 is in a high state, one may measure 3.7 volts and one may use this voltage to control relay RL1 as will be further explained in the following text.

When the Smartphone 10 is disconnected from the Smartphone Charging Alarm Feedback Device 40 by the user, the output of Operational Amplifier Sensing Circuit 50 will drop to a zero voltage state since there may be no current draw from the Smartphone 10 internal battery and no proportional voltage drop observed across resistor RS in Operational Amplifier Sensing Circuit 50 as previously explained. Thus, the output of Comparator Circuit 70 can be used to apply a low signal of zero volts to relay RL1 coil contacts which may effectively keep the Normally Open contacts of relay RL1 open when a Smartphone 10 is not connected to the Smartphone Charging Alarm Feedback Device 40. Likewise, the output of Comparator Circuit 70 may be used to apply voltage to relay RL1 coil contacts which may effectively cause the Normally Open contacts of relay RL1 to close; thus permitting the output signal of Comparator Circuit 60 to pass thru the Normally Open contacts of relay RL1 as previously described to the Buzzer Pulse Generator Circuit 100. The application of voltage to relay RL1 coil contacts may be achieved by using the output of U2 to drive transistor Q1 using resistors R15 and R16. The values of resistors R15 and R16 may be selected to provide stabilization to the output of U2 to prevent noise or voltage swings while driving transistor Q1. When output voltage from U2 as previously described drives transistor Q1, a negative voltage or ground may be applied to the negative side of relay RL1 coil through transistor Q1 while a constant 5.0 volts may be applied to the positive side of relay RL1 coil, thus energizing the coil of relay RL1 and closing the Normally Open contacts of relay RL1. Therefore, in using the configuration of Comparator Circuit 70 and Relay Circuit 80 as described, it may be feasible to provide a disable function to mute the Audible Buzzer Circuit 110 which is driven by Buzzer Pulse Generator Circuit 100 when the Smartphone 10 is disconnected from the Smartphone Charging Alarm Feedback Device 40. The functionality of the Audible Buzzer Circuit 110 and Buzzer Pulse Generator Circuit 100 will be further explained in following text.

Referring to FIGS. 4 and 5, the Buzzer Pulse Generator Circuit 110 may be activated by receiving a supply voltage of 3.7 volts on pins 4 (reset) and 8 (supply voltage) of U4 from Comparator Circuit 60 through the Normally Open contacts of relay RL1 in the Relay Circuit 80 as previously explained. U4 may be an integrated circuit commonly known as a 555 timer which may be used to generate a low and high alternating output signal. The alternating low and high output signal may be used to drive an audible alarm and/or visual indicator such as a LED.

Pertaining to the Smartphone Charging Alarm Feedback Device 40, the Buzzer Pulse Generator Circuit 100 which may be powered by the output of Comparator Circuit 60 may be configured with resistors R3 and R4 along with C2 to generate a low and high alternating output frequency as determined by the inventor. The values of R3, R4 and C2 may be selected to give the desired low and high alternating output frequency as so desired by the inventor. The alternating output voltage low signal may be 0 volts where as the high signal may be approximately 2.4 volts. It should be noted that by changing the values of R3, R4 or C2 components, one may change the frequency of the low and high alternating output such that the transition from low to high state is faster or slower. It should also be noted that by changing the values of said components, one may change the duration of the low and high state also known as output frequency. In the described configuration, one side of resistor R3 may be connected to 5 volts while the other side of resistor R3 may be connected to pin 7 (discharge) of U4. Similarly, one side of resistor R4 may be connected to pin 7 of U4 while the other side of resistor R4 may be connected to pins 2 (Trigger) and 6 (Threshold) of U4. Also, the positive side of polarized capacitor C2 may be connected to pins 2 and 6 and the negative side of capacitor C2 may be connected to ground or −5 volts.

Pertaining to the Smartphone Charging Alarm Feedback Device 40, the previously described alternating low and high output signal from the Buzzer Pulse Generator Circuit 100 is fed into Transistor Q2 to drive the Audible Buzzer Circuit 110. The high alternating output of U4 may be used to drive transistor Q2 using resistors R13 and R18. The values of resistors R13 and R18 may be selected to provide stabilization to the output of U4 to prevent noise or voltage swings while driving transistor Q2. During the high output cycle of the alternating output of U4, transistor Q2 may be driven to effectively provide a ground path to the negative pin of buzzer P1 in the Audible Buzzer Circuit 110. During the low output cycle of the alternating output of U4, transistor Q2 may not be driven and effectively remains open, thus not providing a ground path to the negative pin of buzzer P1 in the Audible Buzzer Circuit 110. The positive side of buzzer P1 in the Audible Buzzer Circuit 110 may receive +5 volts through switch SW1 and resistor R14. Switch SW1 may be used by the user to put the Smartphone Charging Alarm Feedback Device 40 into a silent mode whereas only the visual LED indicator 120 may function to alert the user as to the Smartphone 10 internal battery charge status. Resistor R14 may be used to adjust the pitch and/or volume of the buzzer as defined by the inventor. With switch SW1 in the closed position along with the alternating low and high voltage signal supplied by the output of U4 as previously described in the Buzzer Pulse Generator Circuit 100, the Smartphone Charging Alarm Feedback Device 40 may effectively emit an intermittent beeping sound and flashing LED to alert the user of the charge status of the Smartphone 10. The color of said LED may be selected and/or changed as defined by the inventor.

The previously mentioned LED indicator 120 circuit which may be used to alert the Smartphone 10 user of the Smartphone 10 internal battery charge status may be a common LED configured with resistor R6. The value of resistor R6 is selected by the inventor to determine the brightness of LED2. LED2 is configured similarly to the Audible Buzzer Circuit 110 in that it may receive its ground signal via transistor Q2 which as previously described may be driven by the output of U4. It should be noted that by this method, LED2 emits a flashing light corresponding to the sound of buzzer P1 in the Audible Buzzer Circuit 110. Thus the Smartphone Charging Alarm Feedback Device 40 may provide the Smartphone 10 user an audible and visual alarm corresponding to the previously described circuitry indication of a fully charged Smartphone 10 internal battery.

Referring to FIGS. 4 and 5 a second visual indicator, LED indicator 90 is shown. The purpose of this visual indicator may be to indicate that power is supplied to the Smartphone Charging Alarm Feedback Device 40 through USB Type A Male 130 cable which may be accessible from the exterior housing of the Smartphone Charging Alarm Feedback Device 40. The color of said LED may be selected and/or changed as defined by the inventor. Power supply to the Smartphone Charging Alarm Feedback Device 40 may be achieved by plugging the USB Type A Male 130 cable attached to the Smartphone Charging Alarm Feedback Device 40 into a Smartphone charging device 30 as shown in FIG. 3. It should be noted that the Smartphone charging device 30 may be plugged into an AC voltage receptacle. It should also be noted that a Smartphone 10 does may not have to be connected to the Smartphone Charging Alarm Feedback Device 40 as previously described in order for LED indicator 90 to function when the Smartphone Charging Alarm Feedback Device 40 is connected to a Smartphone charging device 30.

It should be noted that a standard USB Type A Male to USB Type B Male cable 20 may include two digital signal lines that may be used for data transfer to and from the Smartphone 10 and/or other functions. Referring to FIGS. 4 and 5, the Smartphone Charging Alarm Feedback Device 40 may not utilize the two digital signal lines previously described. Rather they may be passed through the Smartphone Charging Alarm Feedback Device 40 in an uninterrupted state via the USB Type A Male 130 cable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic circuit for indicating when a smart phone is charged, the electronic circuit comprising:
   an operational amplifier circuit for sensing current draw of the smart phone;
   an first comparator circuit for detecting a smart phone and a smart phone charger are connected to the electronic circuit;
   a second comparator circuit for monitoring a smart phone charge status;
   a buzzer pulse generator circuit for driving a piezo buzzer and a light emitting diode;
   a relay circuit for disabling the buzzer pulse generator circuit;
   an audible piezo buzzer circuit for an audible alarm when the smart phone is charged;
   a first light emitting diode circuit to provide a visual alarm when the smart phone is charged;
   a second light emitting diode circuit for indicating when the electronic circuit is connected to a power supply;
   a first connector for enabling connection to the smart phone;
   a second connector for enabling connection to the smart phone charger;
   wherein the buzzer pulse generator further comprises:

a LM555 timer integrated circuit (IC) wherein a Reset and a positive voltage (V+) pins are connected to a common contact of the relay circuit, an output pin configured with a first and second resistor of the buzzer pulse generator circuit to provide a reference voltage capable of driving a base connection of a transistor in the audible buzzer circuit, a Discharge pin configured with a third and fourth resistor of the buzzer pulse generator circuit in series with a first capacitor of the buzzer pulse generator circuit to set a rate of the LM555 output discharge voltage, a trigger pin (TRIG) and a threshold pin (THR) connected between the fourth resistor of the buzzer pulse generator circuit and the first capacitor of the buzzer pulse generator circuit to enable/disable the LM555 IC when power is applied/disconnected, a control pin (CV) connected to a ground node through a second capacitor of the buzzer pulse generator circuit to filter a supply voltage and a ground pin (GND) is connected to the ground node.

2. The electronic circuit of claim 1, wherein all components of the electronic circuit are contained on a single printed circuit board.

3. The printed circuit board of claim 2, wherein the printed circuit board is enclosed in a plastic enclosure.

4. The operational amplifier circuit of claim 1, further comprising:
a fifth resistor of the operational amplifier circuit coupled between a ground node of an input voltage and a ground node of the smart phone; a sixth and seventh resistor of the operational amplifier circuit configured to provide a reference voltage proportional to the current draw across the fifth resistor of the operational amplifier circuit; an eighth and ninth resistor of the operational amplifier circuit configured amplify an output of an operational amplifier; and wherein the output of the operational amplifier varies proportionally to a current draw across the fifth resistor of the operational amplifier circuit.

5. The first comparator circuit of claim 1, further comprising:
a fifth and sixth resistor of the first comparator circuit configured in series between a +5v node and said ground node to provide a reference voltage; and an operational amplifier of the first comparator circuit configured to compare the reference voltage connected to a + non-inverting input to an output of the operational amplifier circuit connected to an − inverting input.

6. The second comparator circuit of claim 1, further comprising:
a fifth and sixth resistor of the second comparator circuit configured in series between +5v node and said ground node to provide a reference voltage; and an operational amplifier of the first comparator circuit configured to compare the reference voltage connected to a + non-inverting input to an output of the operational amplifier circuit connected to an − inverting input, the output coupled to a +5v node with a seventh resistor of the second comparator circuit and the output connected to an normally open contact of an relay in the relay circuit.

7. The relay circuit of claim 1, further comprising:
a relay with one side of coil connected to a +5v node, another side connected to a collector connection of a transistor of the relay circuit, one side of a normally open contacts is connected to an output of the second comparator circuit, a common side of the normally open contact is connected to the Reset and the voltage (V+) of the buzzer pulse generator circuit; and the transistor of the relay circuit configured with a fifth and sixth resistor of the relay circuit wherein a base connection of the transistor of the relay circuit is driven by the output of the first comparator circuit of, and an emitter connection of the transistor of the relay circuit is connected to ground.

8. The audible buzzer circuit of claim 1, further comprising: a piezo buzzer connected to a +5v node through a fifth resistor of the audible buzzer circuit and a switch of the audible buzzer circuit used for muting the piezo buzzer; and a transistor of the audible buzzer circuit wherein a collector connection of the transistor is connected to the one side of the piezo buzzer of the audible buzzer circuit, a base connection of the transistor is connected to the output of the buzzer pulse generator circuit, and a emitter connection of the transistor is connected to said ground node.

9. The first light emitting diode (LED) circuit of claim 8, further comprising: an LED of the first LED circuit with an anode connection of the first LED connected to a +5v node through a fifth resistor of the first LED circuit, a cathode connection of the first LED connected to a collector connection of a transistor of the audible buzzer circuit.

10. The second light emitting diode (LED) circuit of claim 1, further comprising: an LED of the second LED circuit with an anode connection of the LED connected to a +5v node through a fifth resistor of the second LED circuit, an anode connection of the LED connected to ground node.

11. The first connector of claim 1, further comprising:
a female Universal Serial Bus (USB) connector.

12. The second connector of claim 1, further comprising:
a male Universal Serial Bus (USB) Cable wherein one end is connected to the electronic circuit and the male USB cable having a fixed length.

13. The electronic circuit of claim 11, further comprising: plugging one end of the universal serial bus (USB) cable into the first connector; and plugging the other end of the USB cable into a USB port of the smart phone.

14. The electronic circuit of claim 12, further comprising: plugging an open end of the USB cable to a USB port of the smart phone charger.

15. The electronic circuit of claim 8, further comprising: sliding the switch of the audible buzzer circuit to a mute position.

\* \* \* \* \*